(12) United States Patent
Faith et al.

(10) Patent No.: US 10,824,207 B2
(45) Date of Patent: *Nov. 3, 2020

(54) INFORMATION ACCESS DEVICE AND DATA TRANSFER

(71) Applicant: Visa International Service Association, San Francisco, CA (US)

(72) Inventors: Patrick Faith, Pleasanton, CA (US); Mark Carlson, Half Moon Bay, CA (US); Ayman Hammad, Pleasanton, CA (US); Ben Rewis, Oakland, CA (US); Krishna Prasad Koganti, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/108,917

(22) Filed: Aug. 22, 2018

(65) Prior Publication Data

US 2018/0364770 A1 Dec. 20, 2018

Related U.S. Application Data

(63) Continuation of application No. 12/953,372, filed on Nov. 23, 2010, now Pat. No. 10,095,276.

(Continued)

(51) Int. Cl.
*G06Q 20/10* (2012.01)
*G06Q 20/32* (2012.01)
(Continued)

(52) U.S. Cl.
CPC ............ *G06F 1/1694* (2013.01); *G06F 21/40* (2013.01); *G06Q 20/10* (2013.01); *G06Q 20/32* (2013.01);
(Continued)

(58) Field of Classification Search
CPC ....... H04W 4/80; H04W 76/15; H04W 88/02; G06Q 20/10; G06Q 20/32
See application file for complete search history.

(56) References Cited

U.S. PATENT DOCUMENTS 6,295,448 B1 9/2001 Hayes et al.
6,587,835 B1 * 7/2003 Treyz ..................... G06Q 20/12
705/14.64

(Continued)

FOREIGN PATENT DOCUMENTS

JP        2007/058757 A        3/2007
KR    10-2006-0135340 A       12/2006
(Continued)

OTHER PUBLICATIONS

Matt Hamblen, Bump App Draws Buzz at CTIA, Oct. 8, 2009.*

(Continued)

*Primary Examiner* — Hao Fu

(74) *Attorney, Agent, or Firm* — Kilpatrick Townsend & Stockton LLP

(57) ABSTRACT

A server computer determines, based on interaction data, that the first device and the second device are to be paired with each other. After pairing the first device and the second device, communications may be initiated between the devices. Communications may include customer-provided information (e.g., shopping lists) and merchant-provided information (e.g., items in stock or on sale from the consumer's shopping list).

20 Claims, 9 Drawing Sheets

Related U.S. Application Data

(60) Provisional application No. 61/264,543, filed on Nov. 25, 2009.

(51) Int. Cl.
- *G06F 1/16* (2006.01)
- *G06Q 20/38* (2012.01)
- *G06Q 20/40* (2012.01)
- *G06Q 20/42* (2012.01)
- *H04W 12/08* (2009.01)
- *G06F 21/40* (2013.01)
- *H04W 12/00* (2009.01)

(52) U.S. Cl.
CPC ....... *G06Q 20/3224* (2013.01); *G06Q 20/389* (2013.01); *G06Q 20/40* (2013.01); *G06Q 20/4016* (2013.01); *G06Q 20/42* (2013.01); *H04W 12/08* (2013.01); *H04W 12/00508* (2019.01)

(56) References Cited

U.S. PATENT DOCUMENTS

| | | |
|---|---|---|
| 7,089,208 B1 | 8/2006 | Levchin et al. |
| 7,280,096 B2 | 10/2007 | Marvit et al. |
| 7,360,248 B1 | 4/2008 | Kanevsky et al. |
| 7,366,522 B2 | 4/2008 | Thomas |
| 7,420,464 B2 | 9/2008 | Fitzgerald et al. |
| 7,427,926 B2 | 9/2008 | Sinclair et al. |
| 7,463,143 B2 | 12/2008 | Forr et al. |
| 7,535,416 B2 | 5/2009 | Fan et al. |
| 7,575,177 B2 | 8/2009 | Killian et al. |
| 7,657,486 B2 | 2/2010 | Smets et al. |
| 7,669,759 B1 | 3/2010 | Zettner |
| 7,774,231 B2 | 8/2010 | Pond et al. |
| 7,861,985 B2 | 1/2011 | Galvin |
| 7,907,901 B1 * | 3/2011 | Kahn ................. H04M 1/7253 455/41.2 |
| 7,912,591 B2 | 3/2011 | Sekiyama et al. |
| 7,971,156 B2 | 6/2011 | Albertson et al. |
| 8,255,323 B1 | 8/2012 | Casey et al. |
| 8,285,639 B2 | 10/2012 | Eden et al. |
| 2001/0047488 A1 | 11/2001 | Verplaetse et al. |
| 2004/0254868 A1 | 12/2004 | Kirkland et al. |
| 2006/0186994 A1 | 8/2006 | Lin et al. |
| 2006/0256074 A1 | 11/2006 | Krum et al. |
| 2006/0265238 A1 | 11/2006 | Perrier |
| 2007/0003061 A1 | 1/2007 | Jung et al. |
| 2007/0008133 A1 | 1/2007 | Kang |
| 2007/0188323 A1 | 8/2007 | Sinclair et al. |
| 2007/0213045 A1 | 9/2007 | Hermansson et al. |
| 2007/0223476 A1 | 9/2007 | Fry |
| 2008/0041936 A1 | 2/2008 | Vawter |
| 2008/0147461 A1 | 6/2008 | Lee et al. |
| 2008/0175443 A1 | 7/2008 | Kahn et al. |
| 2008/0249864 A1 | 10/2008 | Angell et al. |
| 2009/0065575 A1 | 3/2009 | Phillips et al. |
| 2009/0066647 A1 | 3/2009 | Kerr et al. |
| 2009/0143104 A1 | 6/2009 | Loh et al. |
| 2009/0153342 A1 | 6/2009 | Thorn |
| 2009/0167486 A1 | 7/2009 | Shah et al. |
| 2009/0192937 A1 | 7/2009 | Griffin et al. |
| 2009/0262069 A1 | 10/2009 | Huntington |
| 2009/0320123 A1 | 12/2009 | Yu et al. |
| 2010/0075666 A1 | 3/2010 | Garner |
| 2011/0029400 A1 | 2/2011 | Scipioni |
| 2011/0187652 A1 | 8/2011 | Huibers |

FOREIGN PATENT DOCUMENTS

| | | |
|---|---|---|
| KR | 10-2007-0045765 A | 5/2007 |
| KR | 10-2010-0097644 A | 9/2010 |
| WO | 2004/062131 A1 | 7/2004 |
| WO | 2009/105115 A2 | 8/2009 |
| WO | 2010/039337 A2 | 4/2010 |

OTHER PUBLICATIONS

Fisher, Jon, "The nex Bump Technologies should bump Sequoia," Jon Fisher Blog: The next Bump Technology; http://blogspot.com/../next-bump-technology, (Apr. 13, 2010), 2 pages.
PayPal iPhone App update on Mar. 17, 2010, iTunes Screen shot, (retrieved from: iTunes > App store > Finance > PayPal, an eBay Company), 1 page.
International Search Report, dated Jul. 26, 2011 in PCT/US2010/057997, 10 pp.
International Search Report dated Jul. 27, 2011 in PCT/US2010/058014, 11 pp.
International Search Report dated Aug. 25, 2011 in PCT/US2010/058005, 10 pp.
International Search Report dated Aug. 2, 2011 in PCT/US2010/058016, 11 pp.
International Search Report in PCT/US2011/067421, dated Aug. 29, 2012, 10 pp.
International Search Report in PCT/US2010/057997, dated Jun. 7, 2012, 7 pp.
International Search Report in PCT/US2010/058016, dated Jun. 7, 2012, 8 pp.
International Search Report in PCT/US2010/058005, dated Jun. 7, 2012, 7 pp.
International Search Report in PCT/US2010/058014, dated Jun. 7, 2012, 8 pp.
Non Final Office Action dated Nov. 20, 2012, in U.S. Appl. No. 12/952,811, 15 pp.
Non-Final Office Action dated Dec. 28, 2012 in U.S. Appl. No. 12/953,371, 18 pp.
Final Office Action dated Apr. 25, 2013 in U.S. Appl. No. 12/952,811, 13 pp.
Final Office Action dated Jul. 30, 2013 in U.S. Appl. No. 12/953,371, 26 pp.
Non-Final Office Action dated Aug. 15, 2013 in U.S. Appl. No. 12/953,368, 29 pp.
Non-Final Office Action dated Nov. 8, 2013 in U.S. Appl. No. 12/952,811, 11 pp.
Non-Final Office Action dated Dec. 16, 2013 in U.S. Appl. No. 12/953,371, 26 pp.
Final Office Action dated Jun. 13, 2014 for U.S. Appl. No. 12/953,368, 29 pp.
Non-Final Office Action dated Jun. 30, 2016 in U.S. Appl. No. 12/953,368, 22 pp.
Examination Report dated Dec. 18, 2013 in Australian Patent Application No. 2010324763, 3 pages.
Notice of Allowance dated Feb. 27, 2014 for U.S. Appl. No. 12/952,811, 9 pages.
Notice of Allowance dated May 1, 2014 for U.S. Appl. No. 12/953,371, 11 pages.
Notice of Allowance dated Jul. 10, 2015 for U.S. Appl. No. 14/338,930, 11 pages.

* cited by examiner

INFORMATION ACCESS DEVICE AND DATA TRANSFER

CROSS-REFERENCES TO RELATED APPLICATIONS

The present application is a continuation of U.S. patent application Ser. No. 12/953,372, filed on Nov. 23, 2010, which is a non-provisional application of and claims priority to U.S. Provisional Application No. 61/264,543, filed on Nov. 25, 2009, the entire contents of which are herein incorporated by reference for all purposes.

BACKGROUND

Cellular phones, portable music players, handheld global positioning system (GPS) devices, personal digital assistants, and other mobile devices have become popular among the general public. Some of the functions of these devices include mapping a user's current location, measuring movement and orientation, connecting the user to the Internet, and/or storing calendar reminders and shopping lists. Many people carry these devices around wherever they go.

Some mobile devices include integrated accelerometers. Accelerometers can be used as an input device for the mobile device itself, or as an input device for external devices. Some mobile devices include integrated global positioning system (GPS) units to determine the location of the device.

Users input and store many different types of useful information on their mobile devices that would be useful in providing specialized customer service. Merchants, knowing certain information about the customer, could offer better customer service and more relevant information to the customer. Data from accelerometers and GPS units may be used to communicate useful information to and from users of mobile devices.

BRIEF SUMMARY

Embodiments of the present invention are directed to systems, apparatuses and methods for using a first device with an accelerometer to transfer data by making contact with a second device with an accelerometer, thereby generating interaction data that is representative of the physical contact between the mobile device and the second device. The first device may be a mobile phone. The second device may be a mobile phone or a stationary (i.e., in a fixed position) kiosk or terminal. A first device with an accelerometer physically contacts the second device. Each of the first and second devices generates interaction data (e.g., accelerometer, location, time data, etc.) representative of the physical interaction between the first and second device. A server computer determines, based on interaction data, that the first device and the second device physically interact. After determining that the mobile device and the second device made contact, communications may be initiated between the devices. Communications may include customer-provided information (e.g., shopping lists) and merchant-provided information (e.g., items in stock or on sale from the consumer's shopping list).

In some embodiments, at least two independent interactions between three devices transfer data from a first computing device to a second computing device, after each of the first and second computing devices independently interacts with a mobile device. For example, a first computing device interacts with a mobile device, generating interaction data and transferring information. Then, a second computing device interacts with the mobile device, generating data and transferring information.

In one embodiment, an information access device comprises a first processor, a first sensor coupled to the first processor, and a non-transitory computer readable medium coupled to the first processor. The computer readable medium comprises code for implementing a method including generating first interaction data with the first sensor and initiating comparison of first interaction data with second interaction data. Second interaction data is generated by a mobile device of a customer comprising a second sensor coupled to a second processor. The comparison determines whether the information access device and the mobile device physically interacted. If the information access device and the mobile device physically interacted, communications are initiated between the information access device and the mobile device. The communications may include customer-provided information and merchant-provided information.

In another embodiment, a method comprises receiving first interaction data from a mobile device and receiving second interaction data from an information access device. The first and second interaction data may comprise time data, location data, or accelerometer data. The mobile device may comprise a first processor and a first motion sensor coupled to the first processor. The information access device may comprise a second motion sensor and a second processor coupled to the second motion sensor. The information access device may be a handheld device. After first and second interaction data are received, the method further comprises determining whether the mobile device physically interacted with the information access device with a server computer using interaction data from the mobile device and the information access device. If the mobile device and the information access device physically interacted, communications are initiated between the mobile device and the information access device, wherein the mobile device is operated by a user and the information access device is located at a merchant. The communications between the mobile device and the information access device may comprise customer-provided information and merchant-provided information.

In another embodiment, a method comprises determining, with a remote server computer, when a first device physically interacts with a second device. The first device may comprise a first processor and a first accelerometer coupled to the first processor. The second device may comprise a second accelerometer and a second processor coupled to the second accelerometer. After determining that the first and second device interacted, a token is exchanged between the first and second device after determining when the first device physically interacts with the second device. The token may be stored on at least the first device. The method further comprises determining, with the remote server computer, when the first device physically interacts with a third device. The third device may comprise a third accelerometer and a third processor coupled to the third accelerometer. After determining that the first and third device interacted, the token is transferred from the first device to the third device. The token may be an identifier of data intended to be transferred from the second device to the third device via the first device. The token may be a payment token that is transferred from the second device to the third device after the first and second devices physically interact and after the first and third devices physically interact.

BRIEF DESCRIPTION OF THE DRAWINGS

The disclosure, together with further advantages thereof, may best be understood by reference to the following description taken in conjunction with the accompanying drawings in which.

DETAILED DESCRIPTION

Figure 1:
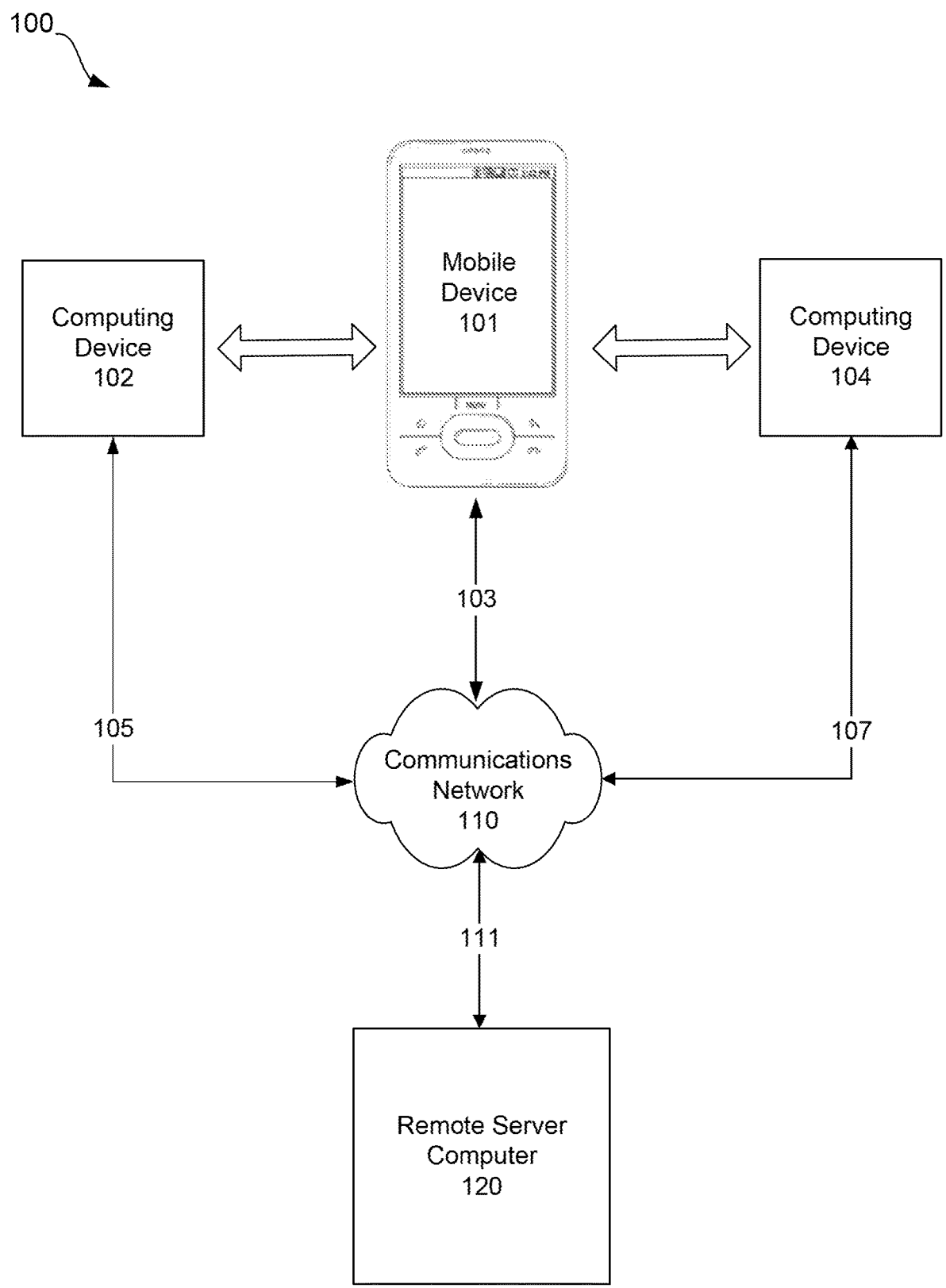
FIG. 1 is a high level diagram illustrating one embodiment of a system in accordance with the present disclosure.

Embodiments of the present invention are related to the transfer of useful information from a first device to a second device after the first and second devices have physically interacted with each other and generated interaction data. Interaction data includes accelerometer data, time data, and location data.

One embodiment of the present invention allows a customer and a merchant to communicate relevant information when the customer is at the merchant's retail location. For example, a merchant may have an information access device positioned at the merchant's store (e.g., near the store entrance, in a high-traffic area, near a particular product display, etc.). The information access device may be handheld and operated by a store employee. Customers may have mobile devices with accelerometers (e.g., smart phones, etc.) that can run applications embodying aspects of the present invention. The customer may have previously entered or stored information on the mobile phone, such as a shopping list, coupons, contact information, search or purchase history, customer preferences, etc. In some embodiments, contact information, search or purchase history, customer preferences, etc. can be located using an identifier associated with the customer or the customer's phone (e.g., online profile or accounts).

The customer may approach the information access device and, using the mobile device belonging to the customer, make physical contact with the information access device. The physical contact between the information access device and the mobile device generates interaction data, which can be used to confirm that the devices intentionally interacted, using a remote server computer with a pairing algorithm. After it has been determined that the information access device and the mobile device interacted, customer information is transferred to the information access device and/or the remote server computer. The information access device and/or the remote server computer analyzes the customer information and communicates special offers, targeted advertisements, or specialized customer assistance.

One example of specialized customer service is a modified shopping list. In response to the customer providing his or her shopping list, the store can provide:

A list of the items on the shopping list and in stock, including aisle numbers

A product map of the items on the shopping list and in stock

A website link to buy an item on the shopping list that is out of stock at the retail location Coupons or promotional offers Suggested "Items You Might Like" based on other items on the shopping list This information may be communicated on a monitor or display coupled to the information access device, or may be communicated using the screen on the customer's mobile device. In other embodiments, the merchant-provided information may be displayed on a handheld device operated by an employee.

In other embodiments, the information access device need not be located at a merchant's retail location. The information access device may be positioned at a trade show or a convention. The information access device may use the user's current location, shipping address, or billing address to suggest locations where a product or service may be purchased.

After customer-provided data and/or merchant-provided data have been exchanged, a financial transaction may be conducted. In some embodiments, the financial transaction is based on subsequent physical interactions between a consumer's mobile device and a merchant's terminal with an accelerometer (e.g., POS terminal). In other embodiments, no subsequent interaction physical is required to engage in a financial transaction, and the transaction may be conducted based on a prior interaction.

Financial transactions between two devices with accelerometers are described in U.S. application Ser. No. 12/952,811, titled "Transaction Using a Mobile Device with an Accelerometer" and filed on Nov. 23, 2010, and U.S. application Ser. No. 12/953,368, titled "Interaction Terminal" and filed on Nov. 23, 2010. These applications are hereby incorporated by reference in their entirety for all purposes.

For example, a customer's mobile device with an accelerometer (or other motion/pressure sensors) may be used to conduct a financial transaction by making physical contact with a merchant's terminal. The customer's mobile device may be a mobile phone or any other mobile device suitable for the customer carrying it on his or her person. The merchant's terminal may be a mobile device, such as a mobile phone, PDA, tablet, handheld device, etc. In other embodiments, the merchant's terminal may be stationary, such as a point of sale (POS) terminal, automated teller machine (ATM), electronic cash register (ECR), kiosk, ticket selling/dispensing terminal, vending machine, magnetic stripe reader device, or personal computer, etc.

When the customer's mobile device makes physical contact with a merchant's terminal, interaction data (e.g., accelerometer data, location data, time data, etc.) is generated. The interaction data generated by each of the customer's mobile device and merchant's terminal is representative of the physical contact. That is, first interaction data is generated by the mobile device based on the external forces applied to the mobile device. Second interaction data is generated by the merchant terminal based on the external forces applied to the merchant terminal.

A server computer determines, based on first and second interaction data, that the customer's mobile device and the merchant's terminal made physical contact and interacted.

In other embodiments, a processor associated with the merchant's terminal (rather than, or in combination with, the remote server computer) may determine, based on first and second interaction data, that the mobile device and the merchant terminal made physical contact and interacted.

The server or merchant's terminal may determine that the customer's mobile device and the merchant's terminal made physical contact by using a pairing algorithm. The pairing algorithm analyzes and matches interaction data to determine whether two devices physically interacted. The server or merchant's terminal may receive and analyze any combination of accelerometer, location, and time data. If the accelerometer, location, and/or time data from the customer's mobile device and the merchant's terminal matches, the pairing algorithm can conclude with sufficient certainty that the devices interacted. If any or all of accelerometer, location, and time data from the customer's mobile device and the merchant's terminal are sufficiently similar, it can be concluded that the customer's mobile device interacted with the merchant's terminal and that the customer and the merchant intend to conduct a financial transaction. The pairing algorithm can analyze the interaction data in any suitable order. Any combination of interaction data may be analyzed, including time data, location data, or accelerometer data.

After determining that the customer's mobile device and the merchant's terminal made contact, communications that relate to payment processing may be initiated between the devices. The payment processing may include the sending of an authorization request message and authorization response message through a payment processing network. The payment processing network (not shown) contains payment authorization, clearing, and settlement services. At the end of the day, a normal clearing and settlement process can be conducted by the payment processing network. A clearing process is a process of exchanging financial details between an acquirer and an issuer to facilitate posting to a consumer's account and reconciliation of the consumer's settlement position. For example, VisaNet™ may be used to process a Visa transaction between the operators of a mobile device and an merchant terminal. The payment processing network may communicate with a plurality of issuer, acquirers, and merchants.

A merchant may have an acquiring bank (acquirer) and the merchant's terminal may be in operative communication with the acquirers. A customer may have an issuing bank (issuer) that issued a transaction account that can be used for making payments. The transaction account may be linked or otherwise connected to the customer's mobile device and/or different type of portable consumer device (e.g., a plastic transaction card). Using the payment processing network, a customer and a merchant may conduct a financial transaction. For example, to receive a payment from a customer, the merchant may initiate the sending of an authorization request message by, or through, its acquirer. The acquirer may then forward or send the authorization request message to the issuer associated with the customer's transaction account and linked to a mobile device of the customer. The issuer may approve or not approve of the transaction and respond with an authorization response message. The authorization response message may be sent to the merchant's acquirer and may be forwarded to the merchant. If approved, the transaction is then completed by the merchant and customer.

One embodiment of the present invention permits the transfer of data (word processing documents, spreadsheets, audio or video files, payment tokens, coupons, etc.) from a first computing device to a second computing device after a first and second interaction. In one embodiment, the first computing device and the second computing device are each personal computers (PCs). A mobile device (e.g., a phone) is used to transfer data from first PC to a second PC. That is, according to this embodiment, data is transferred between two PCs, after each of those PCs interacted with the mobile device in successive fashion. This interaction may cause the first personal computer to transfer data to the second personal computer.

There are numerous technical advantages to the embodiments of the present invention. For example, embodiments of the present invention allow for user of mobile devices to easily and securely communicate information. Retailers can provide more useful information, offers, coupons, and advertisements to the customer based on instantly knowing information communicated by the customer. Embodiments of the present invention permit the use of widely available technologies (e.g., smart phones with accelerometers and location based system capabilities) to be put to use in a retail, payment, or data transfer environment.

Additional details regarding embodiments of the invention are described below.

I. Exemplary System

FIG. 1 is a high level diagram illustrating one embodiment of a system 100 capable of performing the disclosed method. The system 100 includes a mobile device 101, computing devices 102 and 104, a communications network 110, and a remote server computer 120. The elements of the system 100 are in operative communication through communication channels 103, 105, 107, and 111.

The mobile device 101 comprises a processor and a motion sensor coupled to the processor. In one embodiment, the motion sensor is an accelerometer. For example, the mobile device 101 may be a mobile phone, personal digital assistant (PDA), media player, portable game console, etc.

According to embodiments of the system, devices 101, 102, and 104 can be in any suitable form. In some embodiments, devices 101, 102, and 104 may be linked to transaction accounts and may contain a computer readable medium. A transaction account may include credit accounts, debit accounts, and banking accounts, such as checking and savings accounts. Transaction accounts may be associated with transaction cards such as credit cards, debit cards, pre-paid card accounts, gift card accounts, or any other type of payment card. Transaction accounts may contain personal account number (PAN) and other information about the account or account holder. The computer readable medium may embody a program comprising code to perform embodiments of the invention. Any device that is capable of sensing motion and sending/receiving information to communications network 110 would be suitable.

The computing device (e.g., 102 and 104) may be a mobile device, like mobile device 101. Alternatively, the computing devices may be in a fixed position. In one embodiment, the computing devices may be movable but in a fixed position. Although a computing device can have an accelerometer, the computing device could alternatively have another type of sensor such as a pressure sensor.

Devices 101, 102, and 104 may physically interact with each other by bumping or tapping. The processors, geo-location units, and the motion sensors in the devices can provide acceleration data, time data (e.g., timestamps), and/or geo-location data (e.g., GPS coordinates) to a remote server computer indicating that they have made intentional physical contact and that operators of those devices intend for those devices to interact with each other. Collectively, this data is referred to as "interaction data."

Interaction data is data representing the characteristics of an interaction, or attempted interaction, between devices. Interaction data includes accelerometer data. Accelerometer data may include numeric values representing the magnitude and direction of the acceleration as a vector quantity. Interaction data further may include the duration or time period (e.g., the length of time a device was still or near-motionless or the length of time a device was continuously moving). Interaction data may further include the geographic location of the device at the time of an interaction or attempted interaction.

In embodiments of the invention, an accelerometer is used to measure the acceleration that a device with an accelerometer experiences relative to freefall. Single- and multi-axis models can detect the magnitude and direction of the acceleration as a vector quantity. Accelerometers can also be used to sense orientation, vibration, and shock. Exemplary mobile devices could be smart phones, Personal Digital Assistants (PDA), tablet computers, and the like. Micro-machined accelerometers are increasingly present in portable electronic devices and video game controllers. Thus, portable devices with accelerometers and processors are commercially available.

An application may run on the devices 101, 102, and 104. For example, the application or program may be an application downloaded from an application store, music store, or an online marketplace. When the application is started, it may connect to the remote server computer 120. In another embodiment, the connection to the remote server computer 120 may occur only when the application needs to communicate with the remote server computer. Software on the devices may store interaction data and other sensor data. The interaction data may be sent by the devices 101, 102, and 104 to the remote server computer 120 via channels 103, 105, and 107.

The devices may communicate with the remote server computer 120 through any suitable communications channel (e.g., channels 103, 105, 107, and 111). One exemplary communications network 110 would be communications through the Internet. Other examples of a communications channel could include wired and wireless networks (e.g., WiFi) or local and wide area networks. Communication networks 110 may be a cellular data network (e.g., Edge, 3G, 4G, etc.). Devices 101, 102, and 104 can send and receive messages and data through communication channels 103, 105, and 107 to communications network 110.

Certain embodiments of the invention described herein relate to interactions between three devices (a mobile device 101, a first computing device 102, and a second computing device 104). First and second computing devices (102 and 104) may be mobile devices in some embodiments; however, first and second computing devices are not limited to mobile computing devices.

First and second computing devices may be PCs, kiosks, or other terminals. Embodiments of the invention relate to recognizing interactions between devices. For purposes of this description, interaction between two devices (mobile device 101 and computing device 102) are described. However, one having skill in the art will realize that the following description could apply to interactions between mobile device 101 and computing device 104, computing device 102 and computing device 104, and other combinations of devices not shown.

Remote server computer 120 is in operative communication with communications network 110 via communication channel 111. Remote server computer 120 uses the accelerometer data and other interaction data as input to a pairing algorithm designed to match interaction of different devices. Remote server computer 120 receives and monitors accelerometer data from devices 101 and 102 (and other devices, e.g., 104). After remote server computer 120 receives accelerometer data and other interaction data, a pairing algorithm attempts to match the data from two interaction attempts by different devices. An interaction attempt is a movement of a device above a predetermined threshold of movement (or acceleration) made by the operator of the device to start communications with another device.

The pairing algorithm allows the remote server computer 120 to match interaction data between any two devices in the world that tap, bump, or otherwise interact with each other by making physical contact. The pairing algorithm takes numerous input (accelerometer data, time data, location information, and other data representative of the interaction event) from devices 101 and 102 (and others devices, e.g., 104).

For example, to limit the number of potential matches, the pairing algorithm may examine location data first. In another embodiment, the algorithm may examine timestamp data first. In yet another embodiment, the algorithm may examine accelerometer data first. In still other embodiments, the interaction data from the mobile device may be examined substantially at the same time and different types of interaction data may be assigned differing weights. Location information and/or timestamp data may be more conclusive in determining whether two mobile devices were bumped together than accelerometer measurements. In this case, the location information and/or timestamp data may be given more precedence in the pairing algorithm.

When the remote server computer determines that two devices have interacted, the remote server computer may "connect" the two mobile devices so that they can directly communicate with each other. That is, when the remote server computer 120 determines that devices 101 and 102 have interacted with each other, the server computer 120 may "pair" the two devices. At this point, remote server computer 120 acts as a conduit (via channels 103, 105, and 111) for communication between the two devices.

Similarly, if the remote server computer 120 determines that devices 101 and 104 have interacted with each other, the server computer 120 may "pair" the two devices. At this point, remote server computer 120 acts as a conduit (via channels 105, 107, and 111) for communication between the two devices.

Communication sent through communication channels 103, 105, 107, and 111 may be encrypted or otherwise secured. Encryption may be based on interaction data.

In one embodiment, a first computing device 102 is located at a merchant's retail location. The first computing device 102 may be an information terminal, kiosk, TV/computer monitor, or any other device where a customer of the merchant could go for information about products or services offered by the merchant. The first computing device 102 may, in some embodiments, be integrated with a point of sale (POS) terminal, automated teller machine (ATM), electronic cash register (ECR), vending machine, magnetic stripe reader device, or personal computer. Therefore, the first computing device may be in operation communication with a payment processing network.

A customer can transfer information to the merchant, by tapping or bumping the customer's mobile device 101 against the first computing device 102. After the physical interaction between the device has been recognized, the mobile device 101 and the first computing device 102 may transfer information via a communications network 110 and remote server computer 120. The information transferred by the customer may include shopping lists, wish lists, coupons, contact information, membership information, search history, purchase history, or any other information describing the customer and/or the customer's preferences, as described in more detail herein. The merchant may transfer information to the customer including offers or coupons, in stock items on the consumer shopping or wish list, rewards information, products suggestions, maps of the location of products on the consumer shopping/wish list, etc., as described in more detail herein.

In another embodiment, information may be transferred between a first computing device 102 and a second computing device 104 after two separate interactions with a mobile device 101. A first interaction occurs between mobile device 101 and first computing device 102. A second interaction occurs between mobile device 101 and second computing device 104. The information may be transferred using mobile device 101 as a messenger for all or part of the information to be transferred.

That is, in one embodiment, information or data may be transferred from first computing device 102 to the mobile phone 101 after a first interaction (with each device generating interaction data representative of the first interaction). Then, the same information or data may be transferred from the mobile phone 101 to the second computing device 104 after a second interaction (with each device generating interaction data representative of the second interaction).

In another embodiment, a token or identifier is transferred from first computing device 102 to the mobile phone 101 after a first interaction, and then from mobile phone 101 to the second computing device 104 after a second interaction. The token may be an identifier for, or a representation of, the complete data or information that is to be transferred. The token may allow the second computing device 104 to download the information or data from remote server computer 120. In some embodiments, the token is a payment token that represents a monetary value. The payment token may allow the second computing device 104, which may be a second mobile phone belonging to a user, to unlock funds or transfer money to an account associated with the second mobile phone.

Figure 2:
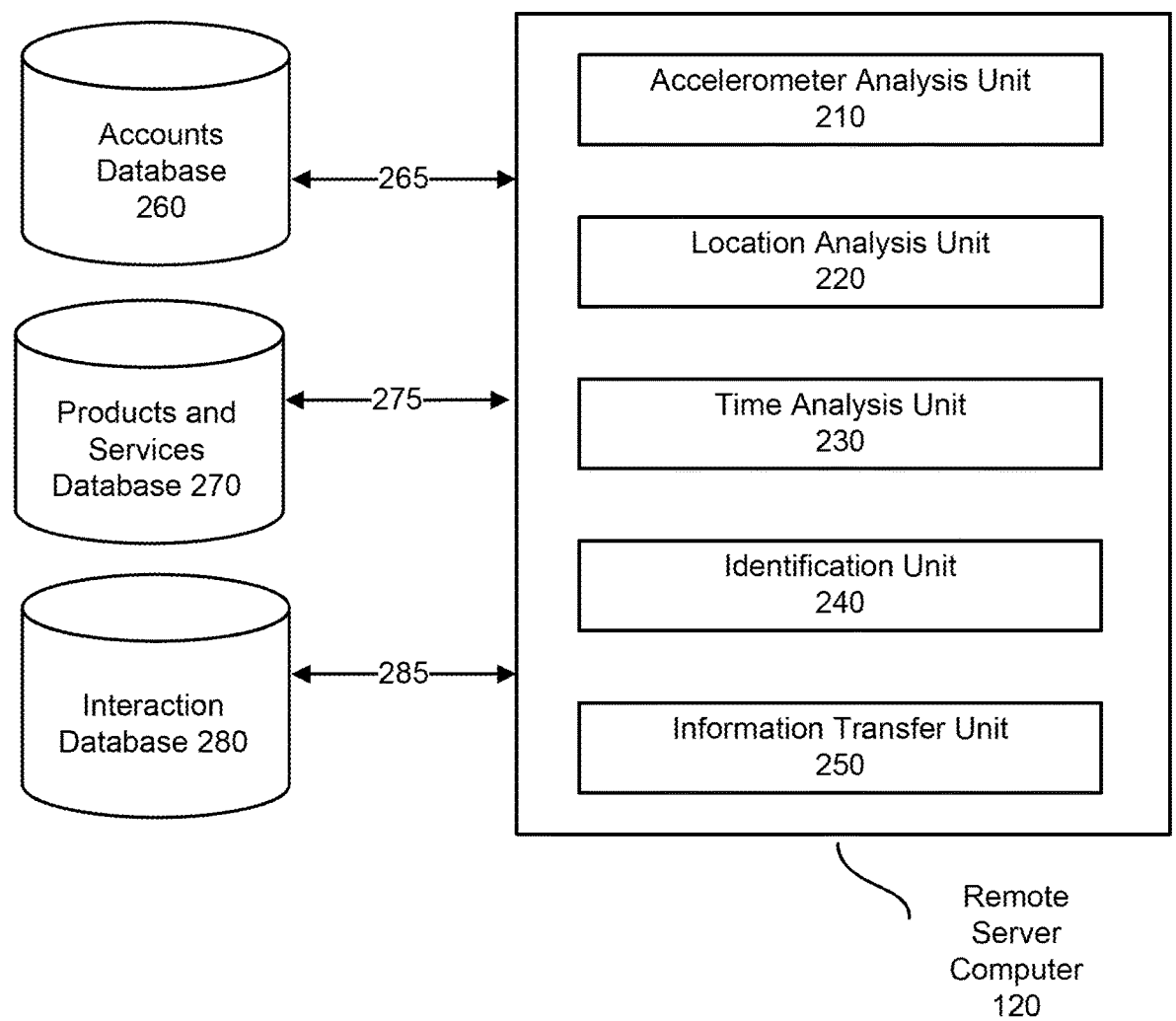
FIG. 2 is a high level diagram illustrating one embodiment of a remote server computer in accordance with the present disclosure.

FIG. 2 depicts an embodiment of the remote server computer 120 which may be in operative communication with the communications network (not shown). Remote server computer 120 may include an accelerometer analysis unit 210, location analysis unit 220, time analysis unit 230, identification unit 240, and information transfer unit 250, which may be used alone or in combination to resolve or "match" devices that have interacted with each other (e.g., made intentional physical contact). Units within the server computer are coupled to a processor. Databases (e.g., 260, 270, and 280) may be associated with the remote server computer 120 and/or may be in operative communication through communication channels 265, 275, and 285, which may be wired or wireless connections. In some embodiments, databases 260, 270, and 280 are part of the remote server computer.

Accelerometer analysis unit 210 compares accelerometer data from a plurality of devices (e.g., 101, 102, 104, etc.). Accelerometer data may include the magnitude and direction of the acceleration. Accelerometer data may also include orientation data (such as pitch, yaw, and roll and/or cardinal direction of the device). From the accelerometer data, the accelerometer analysis unit 210 can determine whether two devices intentionally have interacted with each other. For example, if the absolute value of the magnitude of the measured acceleration of two devices is equal, or substantially equal, the accelerometer analysis unit 210 can determine with relative certainty that the two devices have interacted together. In embodiments where magnitude and direction of the acceleration are analyzed by the accelerometer analysis unit 210, it would be expected that devices that are "bumped" together would have substantially equal acceleration magnitude in opposite directions. That is, accelerometer analysis unit 210 can determine with relative certainty that the two devices were "bumped" together if the accelerometer data of two devices was substantially equal and opposite.

Location analysis unit 220 may be used to help further resolve conflicts from interaction data generated from the plurality of devices (e.g., 101, 102, 104, etc.). Location analysis unit 220 may be part of a location-based service (LBS), which is an information service on a mobile device that utilizes the geographical position of the mobile device. The location analysis unit compares location data from a plurality of devices and determines whether any two devices are sufficiently close when acceleration (above a predetermined threshold) occurred to indicate a likelihood that two devices have interacted with each other. Location data is obtained through GPS units residing in the devices (e.g., 101, 102, 104, etc.). Cellular tower data may also be used to determine the location of a device. As discussed above, interaction data from numerous devices is sent to the remote server computer for comparison and analysis. Location data may be used to supplement accelerometer data in order to determine whether two devices have interacted. For example, if two devices with substantially similar acceleration data were also within 100 feet of each other according to location data, there is a high probability that the devices have intentionally interacted with each other.

Time analysis unit 230 may be used to help further resolve conflicts from interaction data generated by the plurality of devices (e.g., 101, 102, 104, etc.). The time analysis unit compares time data from a plurality of devices and determines whether any two devices accelerated at the same time, or substantially the same time. Time data is obtained from the devices. Time data may include a timestamp indicating when acceleration (above a predetermined threshold) started or stopped as well as the duration of the device's movement. For example, the server computer may determine with greater certainty that devices with similar acceleration data have interacted with each other if the time data from the respective devices is also similar.

Identification unit 240 may be used to identify the device associated with any given interaction data. A device may be identified by its phone number, SIM card numbers, serial number, or hardware ID. Identification unit 240 may look up user information or account information associated with a device by querying accounts database 260. Accounts database 260 may be linked to data to be transferred or downloaded by a specific user. Accounts data base be linked to information about the transition history of a specific user.

A products and services database 270 stores information about products and services offered by a particular merchant or plurality of merchants. In some embodiments, products and services database 270 contains information about the inventory and prices of products and services offered by a particular merchant. The particular merchant may be the merchant where an information access device is located. In some embodiments, products and services database 270 contains information about products and services offered by a plurality of merchants other than the merchant where an information access device is located.

For example, a first merchant may have an information access device located at its "brick and mortar" retail store. The products and services database 270 may have information about the inventory and prices offered at that store and, if the items are in stock, the location of the item in the store (e.g., by aisle number or GPS location data). Additionally, the products and services database 270 may have information about the inventory and prices offered online by the first merchant. The products and services database 270 may also have information about the inventory and prices offered by a second merchant (or any number of additional merchants).

After remote server computer 120 has determined that two devices have interacted, the information transfer unit 250 queries (through communication channels 265, 275) the appropriate databases to determine what data to transfer and aggregates information to transfer between the devices. For example, the customer may transfer a shopping list. The information transfer unit 250 may query the products and services database 270 to determine if the products and services contained on the shopping list are in stock, the prices of the items, and the location of the items in the store. For items that are not in stock, the information transfer unit 250 may query the products and services database 270 to determine whether the item is offered online or by a partner merchant. If the product is offered online (as indicated in the products and services database 270), the customer may be presented with the option to buy the product online and shipped to the customer.

Figure 3A:
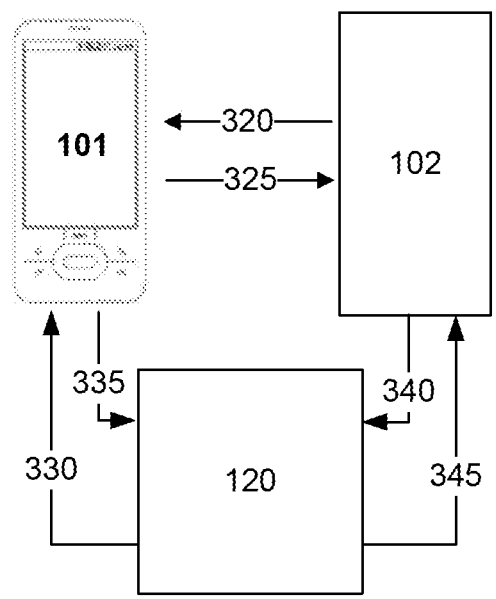
FIGS. 3A-C are high level diagrams illustrating various embodiments of communications between devices and a remote server computer in accordance with the present disclosure.
Figure 3B:
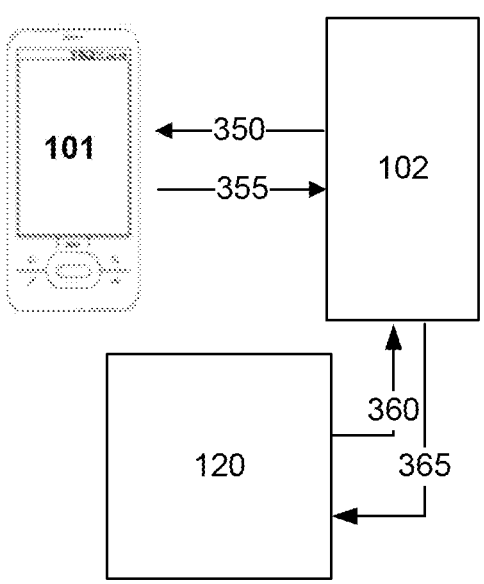
Figure 3C:
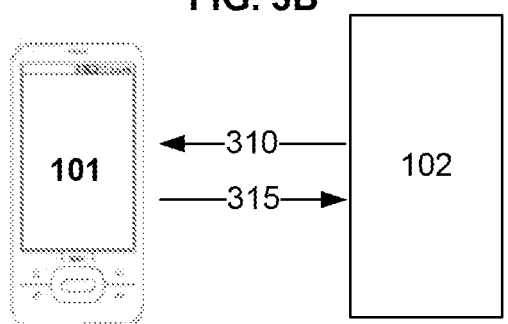

In FIG. 1, devices (e.g., 101, 102, 104) do not directly communicate with each other, but communicate with each other via a central server computer. FIGS. 3A-C show various embodiments of the communication flows contemplated by embodiments of the present invention. Although illustrated as mobile phones, in FIGS. 3A-C, devices 101 and 102 can be any type of device with a motion sensor (e.g., accelerometer). Communications network 110, depicted in FIG. 1, is not shown for the purposes of this illustration. However, one of skill in the art would understand that the devices 101, 102 communicate with remote server computer 120 via a communications network.

FIG. 3A shows a system whereby a remote server computer 120 provides both devices 101 and 102 with session keys, and devices 101 and 102 can communicate directly with each other as long as the session keys are active. Session keys may be based, in part, on the accelerometer data from one or both of the devices 101 and 102. In this embodiment, launch of applications on devices 101 and 102 may automatically initiate a request for the session keys. Devices 101 and 102 may "bump" and communicate with each other. This causes first interaction data to be sent from device 101 to remote server computer 120 via connection 335 and second interaction data to be sent from device 102 to remote server computer 120 via connection 340. Remote server computer 120 determines, based on interaction data, that the operators of the two devices want to exchange information. Session keys may be sent by remote server computer 120 to devices 101, 102 via connections 330, 345. While session keys are active, devices 101 and 102 may directly exchange information through wireless links 320 and 325 (e.g., RF and/or infrared).

FIG. 3B shows a system including two devices 101 and 102 that communicate through wireless links 350 and 355 (e.g., RF and/or infrared) and one of device 101 and device 102 that communicates with a remote server computer 120 via connections 360 and 365. In this embodiment, device 101 could communicate with the remote server computer 120 through device 102 after a session key is generated. Accelerometer data, time-stamp data, etc. can be sent from device 101 to the remote server computer 120 via device 102. The processor in device 102 can send any suitable interaction data to the remote server computer 120 after devices 101 and 102 have interacted with each other.

FIG. 3C shows a system including device 101 and device 102 communicating with each other without the use of an intermediate remote server computer 120 after a session key is generated. In this embodiment, the two devices 101 and 102 may communicate with each other through wireless links 310 and 315 (e.g., RF and/or infrared).

II. Exemplary Methods

Figure 4:
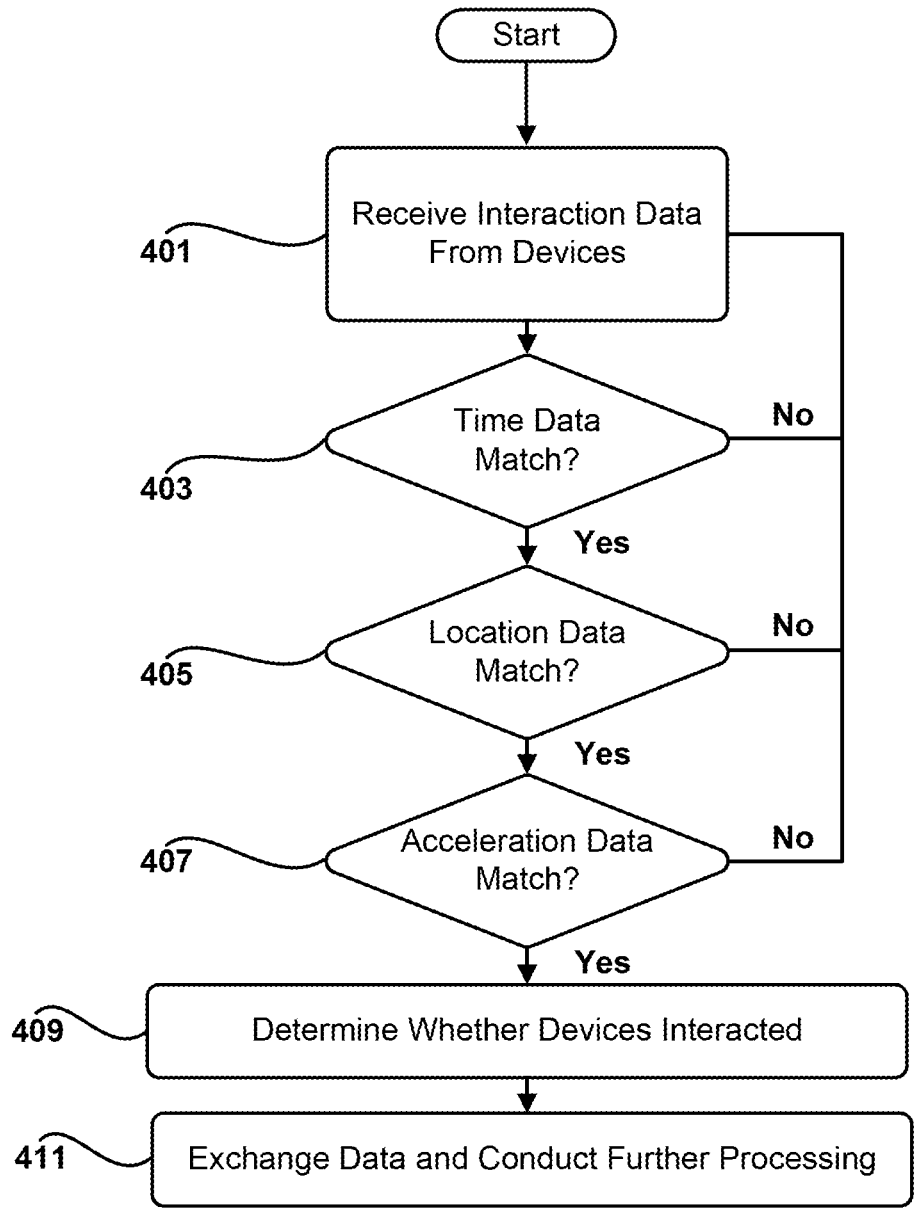
FIG. 4 is a high level flow diagram illustrating an embodiment of a method of the present invention.

FIG. 4A is a high-level flow diagram illustrating one embodiment of a method of resolving interaction data from a plurality of devices. The method in FIG. 4A can be described with reference to FIGS. 1 and 2. For example, the pairing algorithm, described above, may execute the following:

In step 401, remote server computer 120 receives accelerometer, location, and time data from devices 101, 102 (in FIG. 1). In step 403, time analysis unit 230 (in FIG. 2) compares the time data from device 101 with time data from device 102. If the time data matches, or is substantially the same, the location analyzer unit 220 compares the location data from device 101 with location data from device 102 (step 405). If the time data does not match, remote server computer 120 returns to state 401 and monitors and receives accelerometer, location, and time data from a plurality of devices.

If the location data matches, or the information indicates that the devices are substantially close, the accelerometer analysis unit compares the accelerometer data from device 101 with accelerometer data from device 102 (step 407). If the location data does not match, remote server computer 120 returns to state 401 and monitors and receives accelerometer, location, and time data from mobile devices.

If the accelerometer data matches, or is substantially similar, remote server computer 120 can determine with sufficient certainly that the devices 101, 102 intended to interact (step 409). If the accelerometer data does not match, remote server computer 120 returns to state 401 and monitors and receives accelerometer, location, and time data from mobile devices. The receipt and analysis of data illustrated in steps 401, 403, 405, and 407 may be completed in any suitable order. For example, analysis of the accelerometer data (step 407) may be completed before analysis of time data (step 403).

In step 411, the remote server computer 120 facilitates the exchange of data between devices (e.g., 101, 102, 104, etc.) and may perform further processing. Examples of further processing include querying the appropriate databases for information and processing that information so that the information is useful to a user of a mobile device or a merchant. Data may be exchanged between devices as illustrated in FIGS. 1 and 3A-C.

III. Exemplary Interactions Between Devices

Figure 5:
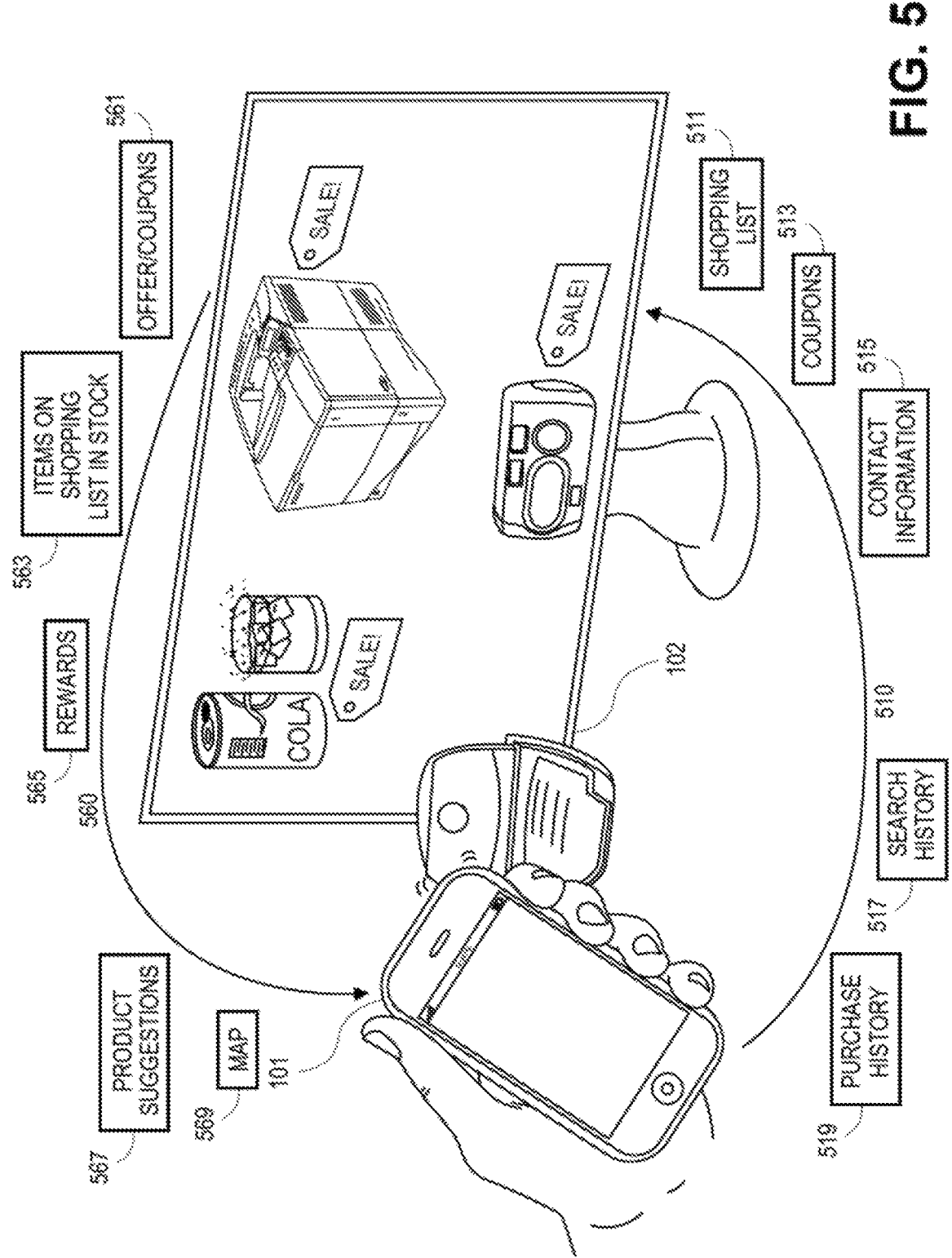
FIG. 5 is a block diagram of devices in accordance with the present disclosure.

FIG. 5 is block diagram of one embodiment of a mobile device 101 and a computer device 102 interacting and transferring information. The mobile device 101, belonging to a customer, may make physical contact with the computer device 102, which may be located at a merchant location. The remote server computer (not shown) determines that the mobile device 101 and the computing device 102 physically interacted using first interaction data from the mobile device and second interaction data from the computing device.

An embodiment of computer device 102 is illustrated in FIG. 5. The computer device comprises a display monitor and an information access device. The display monitor may display advertisements, special offers, coupons, store maps, and any other information related to products and services. The information access device may be a device where a customer can tap, bump, or otherwise make physical contact with the user's mobile device to generate interaction data and initiate communications between the mobile device and the computer device. In another embodiment, the computer device does not have a display or user interface and information is displayed on the user's mobile device. The computing device may comprise a processor and a motion sensor coupled to the processor. The computing device further comprises a location unit (e.g., GPS) coupled to the processor. Alternatively, the location of the computing device may be programmed into the computing device.

A remote server computer determines that the mobile device and the computing device physically interacted using interaction data, as described herein. In other embodiments, the computing device (or a server associated with the computing device) determines that the mobile device and the computing device physically interacted using interaction data, as described herein.

After it has been determined that the mobile device 101 and the computing device 102 have interacted, information is transferred between mobile device 101 and a computer device 102, as illustrated by the flow of consumer data 510 and merchant data 560. The information transferred between mobile device 101 and a computer device 102 may comprise consumer data 510 and merchant data 560.

Consumer data 510 includes data describing the customer, such as the customer's name, address, purchase history, membership information (e.g., rewards program), etc. Consumer data 510 may be data describing products/services that the customer is interested in. Consumer data 510 may be data describing products/services that the customer has bought in the past or has searched for on the internet. Consumer data includes, but is not limited to, shopping lists 511, wish lists (not shown), coupons to redeem 513, customer contact information 515, membership information (not shown), search history 517, purchase history 519, and any other information describing the customer and/or the customer's preferences. There are many other examples of consumer data 510, which may be transferred from mobile device 101 to computer device 102.

Shopping lists 511 may have products or services that a particular customer desires to purchase. A wish list is a type of shopping list. A shopping list may be sorted by price, item, date, or priority. Totals or subtotals may be tabulated for the cost of the entire shopping list or subgroups of items on the shopping list. Coupons 513 may include coupons downloaded from the internet or coupons previously delivered to the mobile device from an information access device. Customer contact information 515 may include the name, address, phone number of the customer and may also include membership information, such as reward or loyalty program memberships. Search history 517 and purchase history 519 may include information about internet searches and purchases made by the customer in the past. For example, the user may have used the mobile device 101 to search for LCD TVs, or the customer may have recently purchased a LCD TV, indicating that the customer may be interested in complimentary goods/services.

Purchase history may be determined based on an identifier that associates a particular customer, transaction account, and/or mobile device. For example, purchase and transaction history may be determined by analyzing data from a payment processing network. The payment processing network may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Merchant data 560 includes data describing products, services, or offers that a merchant offers. Merchant data includes, but is not limited to, offers or coupons 561, in stock items on the consumer shopping or wish list 563, rewards information 565, product suggestions 567, maps of the location of products on the consumer shopping/wish list 569, etc. Merchant data is transferred from computer device 102 to mobile device 101.

Offers or coupons 561 may be presented using customer information 510. Therefore, offers or coupons 561 may be customized to the customers' preferences. For example, a collection of all items on a customer's list with active coupons could be presented. A list of in stock items on the consumer shopping or wish list 563 may be generated using shopping list 511 and products and services database 270. Rewards information 565 may include products that the customer could buy to maximize rewards. Product suggestions 567 may include products or services that the customer may be interested in based on products in the customer's shopping list 511. For items that are in stock at a retail location where the information access device is located, the merchant data 560 may include a map of the location of products on the consumer shopping/wish list 569, etc. The map may be used in conjunction with the mobile device's location services. The location services using geo-location information may then guide the customer through the store and assist the customer in gathering in-stock items from the customer's shopping list. There are many other examples of merchant data, which may be transferred from computer device 102 to mobile device 101.

Figure 6A:
FIGS. 6A-B are block diagrams of devices in accordance with the present disclosure.
Figure 6B:
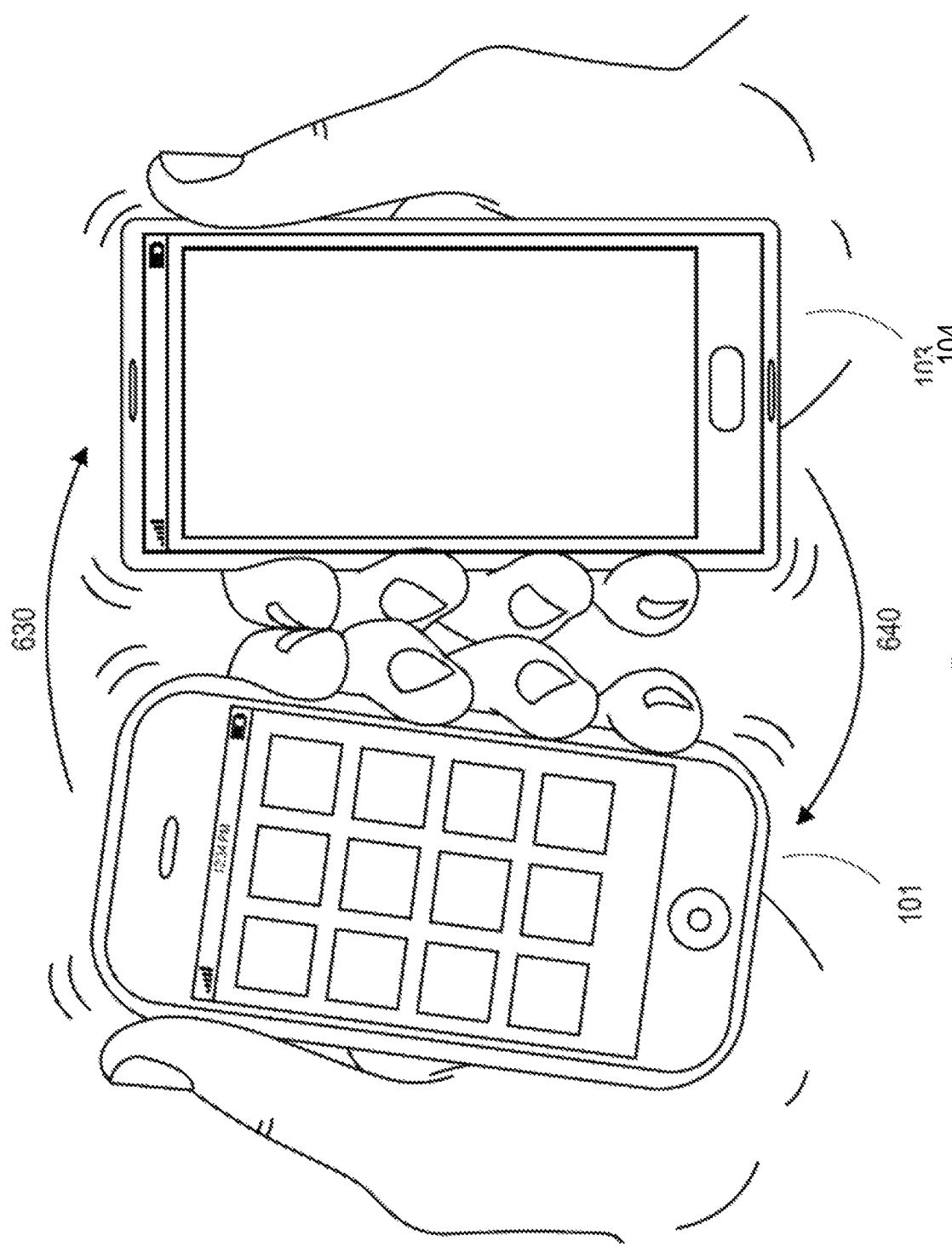

FIGS. 6A-B are block diagrams of one embodiment of computer devices 102 and 104 transferring information using a mobile device 101. The embodiment illustrated in FIGS. 6A-B involve at least three devices and at least two interactions. FIG. 6A shows two of the three device, mobile device 101 and first computing device 102, and shows a first interaction between the mobile device 101 and first computing device 102. FIG. 6B shows the third device, second computing device 104 (in addition to the same mobile device 101), and does a second interaction between the mobile device 101 and first computing device 104.

During the first interaction (between the mobile device 101 and first computing device 102), interaction data is generated by the mobile device 101 and first computing device 102. This interaction data is sent to a remote server computer, which resolves the interactions using a pairing algorithm. The mobile device 101 and first computing device 102 may then communicate and exchange data. The data sent to mobile device 101 (620) may include a token, certificate, or coupon.

During the second interaction (between the mobile device 101 and second computing device 104), interaction data is generated by the mobile device 101 and second computing device 104. This interaction data is sent to remote server computer, which resolves the interactions using a pairing algorithm. The mobile device 101 and second computing device 104 may then communicate and exchange data. The data sent to second computing device 104 (630) may include a token, certificate, or coupon. The data exchanged may allow the ultimate recipient second computing device 104 to download a larger amount of data after being authenticated, in part, based on the token, certificate, or coupon.

In one embodiment, a mobile phone could be used to transfer a payment token from an ATM device and to a second mobile phone by conducting a first interaction between the phone and the ATM device and then conducting a second interaction between the phone and the second phone. Referring to FIG. 6A, mobile device 101 may be a phone, and first computing device 102 may be an ATM.

FIG. 6A shows an example of a first interaction between mobile device 101 and a first computing device 102, which is an ATM device or other device capable of performing financial transactions with a financial account. The mobile device 101 and the first computing device 102 make contact and generate interaction data. A remote server computer (not shown) determines, based on a comparison of the interaction data, that the mobile device 101 and the first computing device 102 interacted. After the remote server determines that the mobile device 101 and the first computing device 102 interacted, information is transferred from the mobile device 101 to the first computing device 102 (610), and from the first computing device 102 to the mobile device 101 (620). The information transfers 610 and 620 may occur using the remote server computer and a communications network (not shown). In one embodiment, a payment token is transferred from the first computing device 102 to the mobile device 101.

FIG. 6B shows an example of a second interaction between the mobile device 101 and a second computing device 104, where the second computing device is a different mobile device. The mobile device 101 and the second computing device 104 make contact and generate interaction data. A remote server computer (not shown) determines, based on a comparison of the interaction data, that the mobile device 101 and the second computing device 104 interacted. After the remote server determines that the mobile device 101 and the second computing device 104 interacted, information is transferred from the mobile device 101 to the second computing device 104 (630), and from the second computing device 104 to the mobile device 101 (640). The information transfers 630 and 640 may occur using the remote server computer and a communications network (not shown). In one embodiment, the payment token that was previously transferred from mobile device 101 to first computing device 102 (610) is then transferred to second computing device 104 (640). When the payment token is received at second computing device 104, the second computing device may use the payment token to receive or unlock funds. In other embodiments, the payment token may be used as a gift certificate at a merchant. In still other embodiments, the payment token may be a coupon or store credit.

In another embodiment, a mobile device (e.g., a phone) could be used to transfer data from a first personal computer and to a second personal computer by conducting a first interaction between the phone and the first computer, and then conducting a second interaction between the phone and the second computer. In each of the first and second interactions, interaction data that is representative of the interactions is generated by the devices. The interaction data is sent to a remote server computer to determine whether the device interacted. After it has been determined that the devices interacted, data is transferred between the devices that interacted. Ultimately, the first and second interactions may cause the first personal computer to transfer data to the second personal computer. The information transferred can be any type of data.

In some embodiments, all of the data to be transferred from the first personal computer to transfer data to the second personal computer is intermediately transferred to the mobile device. In other embodiments, only part of the data to be transferred from the first personal computer to the second personal computer is intermediately transferred to the mobile device. For example, the subset of data that is intermediately transferred to the mobile device may be an identifier of the complete data that is intended to be transferred from the first personal computer to the second personal computer.

IV. Exemplary Device

Figure 7:
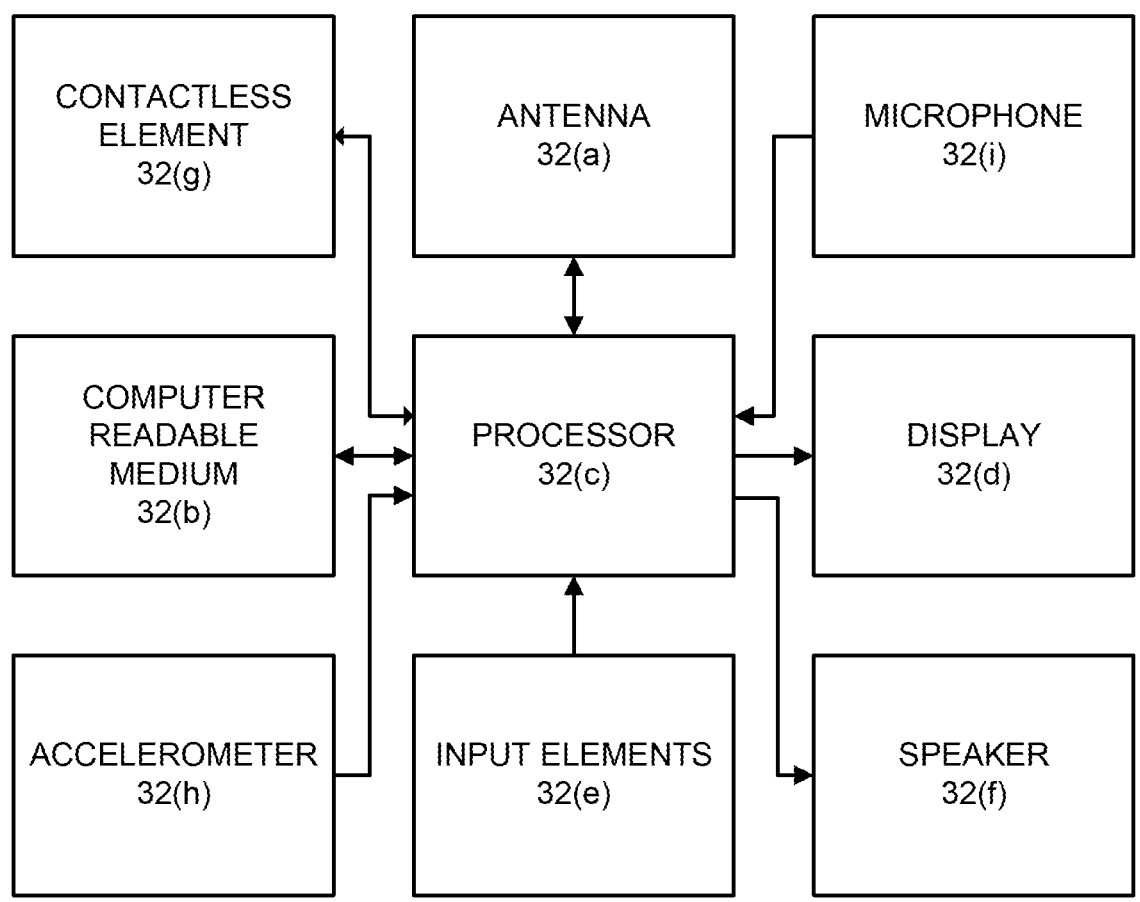
FIG. 7 shows a block diagram of a device in accordance with the present disclosure.

FIG. 7 shows a diagram of some components in an exemplary mobile device or computing device. Devices 101, 102, and 104 may include one or more of the features shown in FIG. 7.

An exemplary device 32 in the form of a phone may comprise a computer readable medium and a body. (FIG. 7 shows a number of components, and the devices according to embodiments of the invention may comprise any suitable combination or subset of such components.) The computer readable medium 32(*b*) may be present within the body (not shown), or may be detachable from it. The body may be in the form of a plastic substrate, housing, or other structure. The computer readable medium 32(*b*) may be a memory that stores data and may be in any suitable form including a magnetic stripe, a memory chip, uniquely derived keys, encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the device 32.

Information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) device 32 and data or control instructions transmitted via a cellular network may be applied to contactless element 32(g) by means of a contactless element interface (not shown). The contactless element interface functions to permit the exchange of data and/or control instructions between the device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the device 32 and an interrogation device. Thus, the device 32 is capable of communicating and transferring data and/or control instructions via both a cellular network and a near field communications line or network.

The device 32 may also include a processor 32(c) (e.g., a microprocessor) for processing the functions of the device 32 and a display 32(d) to allow a consumer to see phone numbers and other information and messages. The device 32 may further include input elements 32(e) to allow a consumer to input information into the device, a speaker 32(f) to allow the consumer to hear voice communication, music, etc., and a microphone 32(i) to allow the consumer to transmit her voice through the device 32. The device 32 may also include an antenna 32(a) for wireless data transfer (e.g., data transmission), and an accelerometer 32(h) which can provide acceleration data to the processor 32(c).

V. Exemplary System Elements

Figure 8:
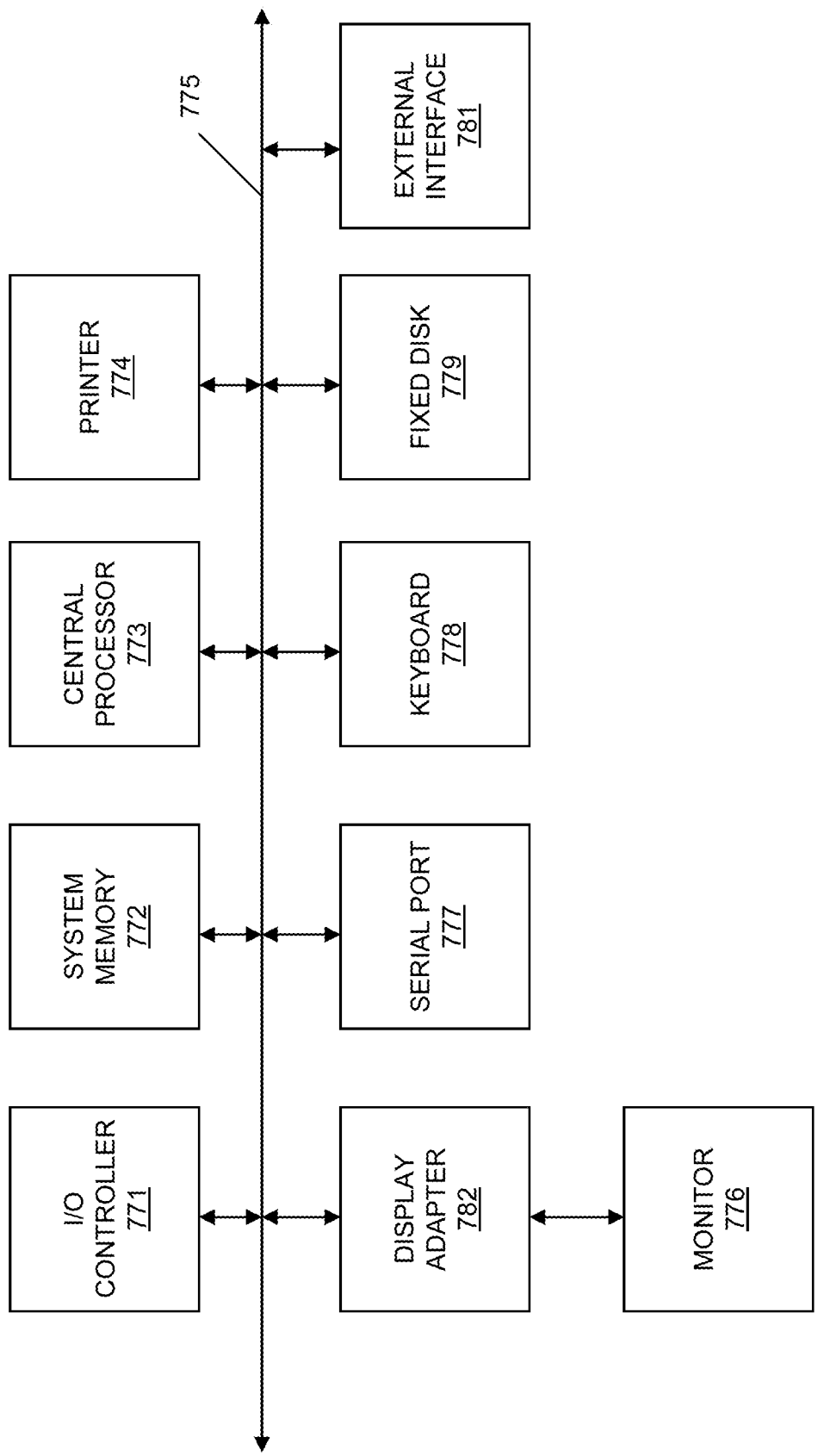
FIG. 8 shows a block diagram of a computer apparatus.

The various participants and elements in FIG. 8 may operate or use one or more computer apparatuses to facilitate the functions described herein. Any of the elements in FIGS. 1-3, and 5-6 (e.g., the devices 101, 102, the remote server computer 120, etc.) may use any suitable number of subsystems to facilitate the functions described herein. Examples of such subsystems or components are shown in FIG. 8, which may illustrate parts of a computer apparatus.

The subsystems shown in FIG. 8 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl, using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

What is claimed is:

1. A method comprising:
    receiving, at a remote server, via a communication network, first interaction data from a mobile device comprising a first processor, a first accelerometer coupled to the first processor, and a first application that is operable to connect the mobile device to the remote server via the communication network, wherein the first interaction data comprises first accelerometer data, first location data, and first time data;
    receiving, at the remote server, via the communication network, second interaction data from an access device comprising a second accelerometer, a second processor coupled to the second accelerometer, and a second application that is operable to connect the access device to the remote server via the communication network, wherein the second interaction data comprises second accelerometer data, second location data, and second time data;
    responsive to receiving first and second interaction data, determining, by a pairing algorithm in the remote server that the mobile device interacted with the access device by comparing the first interaction data and the second interaction data, wherein the pairing algorithm compares the first and second location data before comparing the first and second accelerometer data, and wherein the first and second interaction data being compared by the pair algorithm further comprises, respectively, a first duration of time when the mobile device is still and a second duration of time when the access device is still;
    receiving, by the remote server, information provided by the mobile device;
    after the pairing algorithm determines that the mobile device interacted with the access device, sending, by the remote server, the information provided from the mobile device to the access device;
    receiving, by the remote server, information provided by the access device in response to the receipt of the information provided by the mobile device; and
    after the pairing algorithm determines that the mobile device interacted with the access device, sending, by the remote server, the information provided by the access device to the mobile device.

2. The method of claim 1, wherein the first and second interaction data being compared by the pair algorithm further comprises, respectively, a first duration of time when the mobile device is continuously moving and a second duration of time when the access device is continuously moving.

3. The method of claim 1, wherein the mobile device is operated by a consumer and the information provided by the mobile device comprises at least one of the following:
   information describing the consumer;
   information describing products or services in which the consumer is interested; and
   information describing products or services that the consumer has bought or searched for.

4. The method of claim 1, wherein the information provided by the access device comprises at least one of the following:
   descriptions of products or services; and
   offers or coupons.

5. The method of claim 1, wherein the access device is a POS terminal.

6. The method of claim 1, wherein the mobile device has a GPS unit.

7. The method of claim 1, wherein prior to receiving the first and second interaction data at the remote server, the mobile device makes physical contact with the access device.

8. The method of claim 1, wherein the mobile device is operated by a consumer and the information provided by the mobile device comprises a shopping list.

9. The method of claim 8, wherein the information provided by the access device comprises locations of products on the shopping list.

10. The method of claim 8, wherein the information provided by the access device comprises information on whether products on the shopping list are in stock.

11. A server computer comprising:
   a processor, and
   a non-transitory computer readable medium, the non-transitory computer readable medium comprising code executable by the processor for implementing operations including:
      receiving, via a communication network, first interaction data from a mobile device comprising a first processor, a first accelerometer coupled to the first processor, and a first application that is operable to connect the mobile device to the server computer via the communication network, wherein the first interaction data comprises first accelerometer data, first location data, and first time data;
      receiving, via the communication network, second interaction data from an access device comprising a second accelerometer, a second processor coupled to the second accelerometer, and a second application that is operable to connect the access device to the server computer via the communication network, wherein the second interaction data comprises second accelerometer data, second location data, and second time data;
      responsive to receiving first and second interaction data, determining, by a pairing algorithm that the mobile device interacted with the access device by comparing the first interaction data and the second interaction data, wherein the pairing algorithm compares the first and second location data before comparing the first and second accelerometer data, and wherein the first and second interaction data being compared by the pair algorithm further comprises, respectively, a first duration of time when the mobile device is still and a second duration of time when the access device is still;
      receiving information provided by the mobile device;
      after the pairing algorithm determines that the mobile device interacted with the access device, sending the information provided from the mobile device to the access device;
      receiving information provided by the access device in response to the receipt of the information provided by the mobile device; and
      after the pairing algorithm determines that the mobile device interacted with the access device, sending the information provided by the access device to the mobile device.

12. The server computer of claim 11, wherein the first and second interaction data being compared by the pair algorithm further comprises, respectively, a first duration of time when the mobile device is continuously moving and a second duration of time when the access device is continuously moving.

13. The server computer of claim 11, wherein the mobile device is operated by a consumer and the information provided by the mobile device comprises at least one of the following:
   information describing the consumer;
   information describing products or services in which the consumer is interested; and
   information describing products or services that the consumer has bought or searched for.

14. The server computer of claim 11, wherein the information provided by the access device comprises at least one of the following:
   descriptions of products or services; and
   offers or coupons.

15. The server computer of claim 11, wherein the access device is a POS terminal.

16. The server computer of claim 11, wherein the mobile device has a GPS unit.

17. The server computer of claim 11, wherein prior to receiving the first and second interaction data, the mobile device makes physical contact with the access device.

18. The server computer of claim 11, wherein the mobile device is operated by a consumer and the information provided by the mobile device comprises a shopping list.

19. The server computer of claim 18, wherein the information provided by the access device comprises locations of products on the shopping list.

20. The server computer of claim 18, wherein the information provided by the access device comprises information on whether products on the shopping list are in stock.

* * * * *